United States Patent [19]
Stangeland

[11] 4,044,186
[45] Aug. 23, 1977

[54] SHEAR FLEXIBILITY FOR STRUCTURES

[75] Inventor: Maynard L. Stangeland, Calabasas, Calif.

[73] Assignee: Rockwell International Corporation, El Segundo, Calif.

[21] Appl. No.: 652,594

[22] Filed: Jan. 26, 1976

Related U.S. Application Data

[60] Division of Ser. No. 504,927, Sept. 11, 1974, Pat. No. 3,956,543, which is a continuation-in-part of Ser. No. 294,403, Oct. 2, 1972, abandoned.

[51] Int. Cl.² .......................... B32B 3/30; B32B 15/00
[52] U.S. Cl. .................................. 428/167; 60/39.32; 428/179; 428/36; 428/604
[58] Field of Search .......................... 428/167, 179, 36; 156/209, 210, 219; 220/9 A, 9 R, 72, 9 LG; 29/183, 180 SS; 60/39.32

[56] References Cited

U.S. PATENT DOCUMENTS 3,224,621   12/1965   Upthegrove .................... 220/9 LG

*Primary Examiner*—George F. Lesmes
*Assistant Examiner*—P. Thibodeau
*Attorney, Agent, or Firm*—L. Lee Humphries; Robert G. Upton

[57] ABSTRACT

This device comprises a flexible sheet member having cross convolutions oriented 45° to the shear vector with spherical reliefs at the convolution junctions. The spherical reliefs are essential to the shear flexibility by interrupting the principal stress lines that act along the ridges of the convolutions. The spherical reliefs provide convolutions in both directions in the plane of the cross-convolution ridges.

4 Claims, 8 Drawing Figures

SHEAR FLEXIBILITY FOR STRUCTURES

The invention described herein was made in the performance of work under a NASA contract and is subject to the provisions of Section 305 of the National Aeronautics and Space Act of 1958, Public Law 85-268 (72 Stat. 435; 42 USC 2457).

This is a division of application Ser. No. 504,927 filed Sept. 11, 1974, now U.S. Pat. No. 3,956,543 which is a continuation-in-part of Ser. No. 294,403, filed Oct. 2, 1972 and now abandoned.

BACKGROUND OF THE INVENTION

1. Field of the Invention

There is a need for a sheet member which can contain pressure, operate at cryogenic and elevated temperatures, and provide flexibility for repetitive cycles of parallel offset shear translations. Metallic webbings exist which are basically comprised of a plurality of segments or strips interlaced together. However, this type of structure is very porous and cannot contain pressure or liquid. Hence a solid sheet member is needed which has the same type of flexibility as the aforementioned webbed structure.

2. Description of the Prior Art

There are patents which teach how to deal with thermal and physical expansion of containers, panels, and the like. For example, U.S. Pat. No. 3,224,621 describes a cylindrical vessel for the containment of liquid having a temperature differing from ambient temperature. Embossed modular panels accommodate for thermal expansion and have vertical and longitudinal lines or indentations embossed in the material, the intersecting embossed lines being interrupted by circular embossed lines which intersect all four quadrants of the embossed material. The intersection of the embossed lines consists of a ring with radial spokes in the modular panel to relieve forces introduced by thermal expansion or contraction. The embossed pattern all lies in the same plane and therefore does not interrupt all lines of force introduced by shear translation. The panels have limited flexibility for thermal expansion or contraction but do not exhibit or include shear flexibility as does the present invention.

U.S. Pat. No. 3,335,902 relates to beading of cans and the like. Parallel beads or convolutions are superimposed in the axial and circumferential directions of a cylindrical body wall. The beading depth at each intersection of the axial and circumferential convolutions is equal to the algebraic sum of the individual depths. The objective of the convolutions is to add both axial strength and a paneling or buckling resistance. This pattern is fabricated with one convolution superimposed on the other to achieve rigidity in both directions. The beaded structure is different from the shear flexibility material of the instant invention in that there is no radii at the edge of the convolutions, thus resulting in a relatively stiff structure. Structural stiffness is an objective of this prior art patent, while flexibility in shear is a primary objective of the present invention.

U.S. Pat No. 3,357,593 discloses a means to fabricate a cylindrical structure having tubular wall patterns with helical corrugations which are crosshatched on a tubular wall to resist compressionable and longitudinal forces. Rigidity is introduced with the corrugations and would not provide shear flexibility without spherical reliefs at the convolution intersections. This invention is different than the shear flexibility pattern of the present invention in that the crosshatched corrugations are there to provide rigidity, not flexibility.

SUMMARY OF THE INVENTION

It is an object of this invention to provide shear flexibility in shell-type structures by interrupting the lines of principal stress with convolutions.

More specifically, it is an object of this invention to provide shear flexibility in shell-type structures by interrupting the lines of principal stress with convolutions, the convolutions change the principal membrane tension and compression stresses to bending stresses which significantly decrease the spring rate in the tension and compression direction and eliminates uncontrolled buckling in the compression direction.

The structure consists of cross convolutions oriented 45° to the shear vector with spherical reliefs at the convolution junctions. These sperical reliefs are the key to the shear flexibility by interrupting the principal stress lines that act along the ridges (apexes) of the convolutions. The spherical reliefs provide convolutions in both directions in the plane of the cross-convolution ridges (apexes).

The shear flexibility structure can be made of metallic or non-metallic materials. The member is a continuous membrane which can contain pressure, liquids, etc. The structure can, in addition, carry membrane loads that are oriented 90° to the direction of shear flexibility, which is 45° with respect to the convolutions. The shear flexibility member can operate at any temperature within the capabilities of the materials selected. The shear flexibility member can be sized to take large magnitudes of shear translation, depending on spacing, convolution, and spherical relief size, thickness, and material. This is, in part, govened by fabrication limits.

The material may also be configured into a cylindrical shape thereby taking advantage of the unique properties of the convoluted member.

An advantage over the prior art is that the shear flexibility material is a continuous membrane which can contain pressure.

Still another advantage over the prior art is that the material can operate at any temperature within the capabilities of the material selected.

Yet another advantage is that the material can be sized to take large magnitudes of shear translation, depending on spacing, convolution, and spherical relief sizes, thickness and material.

The above noted objects and advantages of the present invention will be more fully understood upon a study of the following detailed description in conjunction with the detailed drawings.

DESCRIPTION OF THE INVENTION

Figure 1:
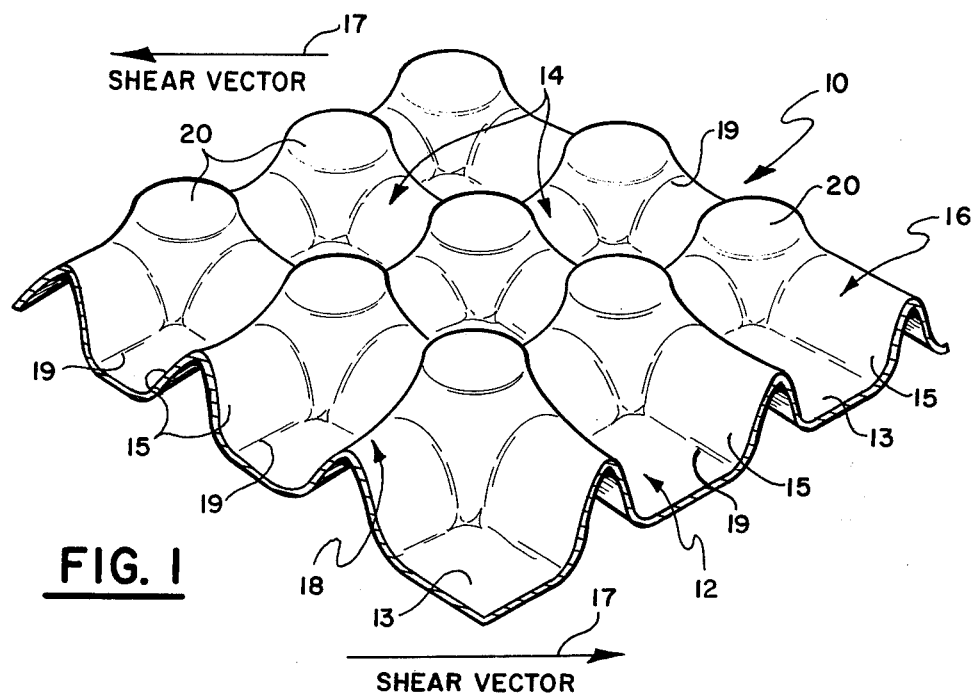
FIG. 1 is a perspective view of a section of the shear flexibility material.

Turning to FIG. 1, the perspective view illustrates a section of shear flexibility material generally designated as 10 which is comprised of a sheet of material 12, for example, stainless steel, which has the following configuration: A series of parallel convolutions or channels having a constant cross-section are generally designated as 14. The convolution wall portion 15 is stamped into the material 12, the convolutions being at approximately 45° angles with regard to a shear vector 17 imparted to panel 10. Convolution 16 is oriented 90° to intersecting convolution or channel 18. At the intersections of the corrugations formed by channels 16 and 18 is a dome-shaped spherical relief 20. The purpose of the protrusion 20 is to provide spherical reliefs at the convolution junctions where the cross convolutions intersect, and to interrupt the principal stress lines that act along the ridges or apexes of the convolutions in the same manner that the convolutions interrupt the principal stress lines that act in the flat sheet 12.

Additionally, a small radii 19 is formed between base portion 13 of material 12 and wall portion 15 of the convolution 14. Radii 19 is also formed where spherical portion 20 intersects and merges with cross convolutions 16, 18. The small radii serves the important function of providing flexibility without rigidity when shear vector forces 17 are imparted to material 10.

The prior art teaches sharp angular bends where convolutions or deformations exist in material which inherently lends itself to rigidity, not flexibility.

The spacing and size of the convolution 14 and spherical relief 20 are dependent on the desired relative shear translation, the available space, material, and material thickness.

The material 12 is selected as a function of the operating temperature, pressure, and media. If the application were to contain a liquid or gas under low pressure at room temperature, a plastic or thin sheet metal could be selected. If the application were to contain a highly corrosive liquid under high pressure at elevated or cryogenic temperatures, a high strength corrosion resistant steel or aluminum could be selected.

The material thickness is a function of the operating pressure and material strength but is selected as thin as possible to maximize the flexibility for a given pattern.

The spacing and size of the pattern is generally designed to limit the maximum operating strain to less than 5000μ in/in (0.5%) for long life applications. The other limit to be considered when designing the pattern is the amount of deformation that the material 12 must undergo during the forming process. Sizing the convolutions 16 and 18 and spherical reliefs 20 can be accomplished analytically by simplifying the pattern into basic structural shapes and limiting the strains to within the desired limit (0.5%). The following geometric relationships are typical design parameters.

Figure 2A:
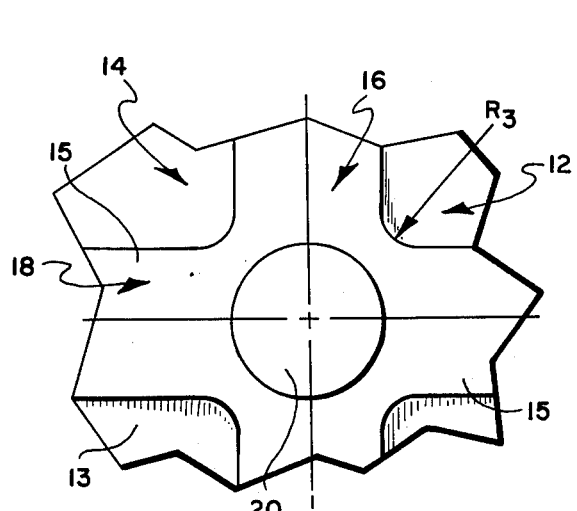
FIGS. 2(a) and (b) depict a plan view (a) and side view (b) of two intersecting convolutions with a spherical relief at the intersection.
Figure 2B:
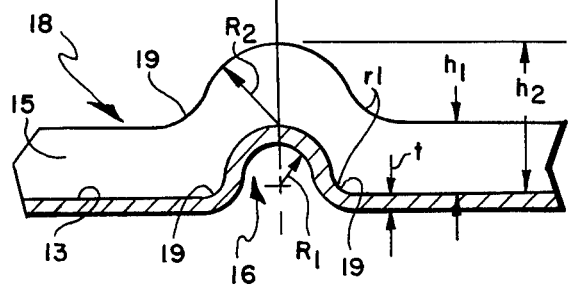

Referring to FIG. 2(b) the material thickness (t) is as thin as possible and the convolution spacing is as small as possible, within forming limits of the material 12. The convolution radii ($R_1$) should be as large as possible, within the forming limits of the material 12; typically $R_1 = 6$ to $12t$. The small transition radii between convolution 14 ($r_1$) are typically $r_1 = 3$ to $5t$. Within the aforementioned ranges, the proportions of $R_1$ and $r_1$ should be maintained between $r_1 = R_1/2$ and $R_1/3$. To illustrate, if $R_1 = 6t$ then $r_1$ should be between $R_1/2 = 6t/2 = 3t$ and $R_1/3 = 6T/3 = 2t$ and between $r_1 = 3t$ to $5t$. Therefore, if $R_1$ is $6t$, $r_1$ should be $3t$. For the case where $R_1 = 12t$, $r_1$ should be between $R_1/2 = 12t/2 = 6t$ and $R_1/3 = 12t/3 = 4t$ and between $r_1 = 3t$ to $5t$. Therefore, if $R_1$ is $12t$, $r_1$ should be 4 to $5t$.

The convolution height ($h_1$) is typically $h_1 = R_1 + r_1$ and therefore, will be between $6t + 3t = 9t$ and $12t + 5t = 17t$.

The spherical relief radii ($R_2$, $R_3$) must be geometrically compatible with each other and with $R_1$. The upper limit of $R_2 \leq 1.4R_1 + 0.4R_3$ is based on preventing the spherical relief from exceeding one-half of a sphere which is the forming limit. The lower limit of $R_2 \geq 1.2R_1 + 0.2R_3$ is based on providing sufficient flexibility. Radius $R_3$ is typically between $R_3 = 1R_1$ to $1.5R_1$. Therefore, $R_2$ can typically be between $R_2 = 1.4R_1 + 0.4 \times 1.5R_1 = 2R_1$ and $R_2 = 1.2R_1 + 0.2 \times 1R_1 = 1.4R_1$.

The total height of the convolution $h_2$ should be equal to $R_2 + 2r_1$ as a lower limit and $2h_1$ as an upper limit.

Some of the aforementioned proportions are based on forming the shear flexibility pattern in sheet metal with conventional cold forming processes. The depth of the convolutions and spherical domes can be increased by using hot forming or explosive forming processes which would increase the flexibility. This would also be possible when forming from plastics.

Figure 3:
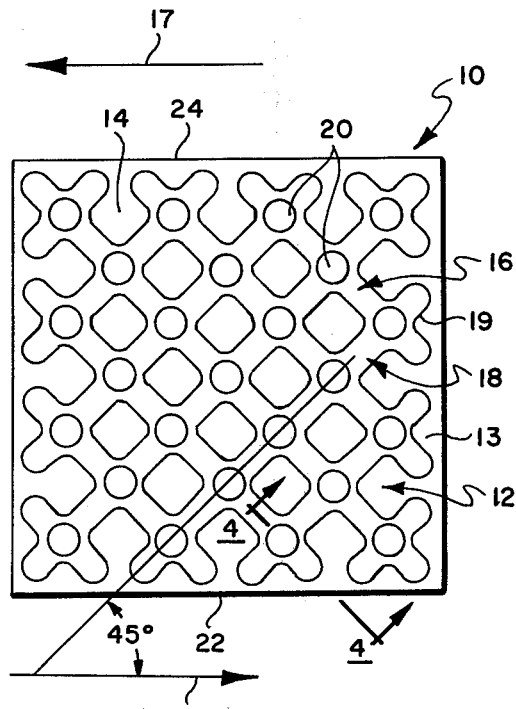
FIG. 3 is a plan view of a section of shear flexibility material showing the 45° shear vector orientation, and the spherical reliefs at the convolution intersections.

FIG. 3 is illustrative of a modular panel having channels 16 and 18 embossed in the panel with the cross convolutions being interrupted by a spherical dome 20. The shear flexibility material may be anchored rigidly along the bottom edge 22 of the metallic material 10. The top edge 24 may be translated from side to side a considerable distance caused by relative motion of adjoining bodies or by a thermal differential between the top and the bottom edges 24 and 22. As the material is flexed, the convolutions 16 and 18 and the domes 20 stretch or contract, as illustrated in FIG. 4.

Figure 4:
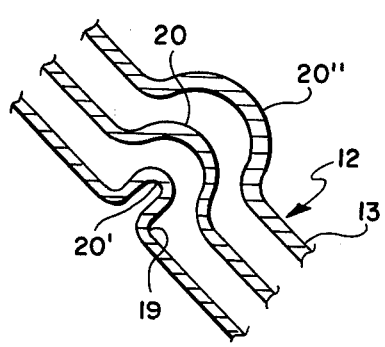
FIG. 4 is a view taken along lines 4—4 of FIG. 3.

Turning to FIG. 4, the material in the unstretched condition would show a cross section of the spherical dome 20 as it appears in the middle configuration. If the material is flexed, then the dome may appear as is shown in 20", where the dome is widened at its base while, conversely, if the material is compressed in the other direction, the domes would appear in a compressed state, as shown in 20'. If the cross section were to be taken through one of the convolutions 16 or 18, the resultant configuration would be the same as shown in FIG. 4. The convolutions are flexed in compression and tension exactly the same as the spherical reliefs. Thus, it can be seen that the convolutions allow for compression or tension in the plane of the sheet and the spherical domes 20 allow for compression or tension at the junction of the convolutions 16 and 18.

Figure 5:
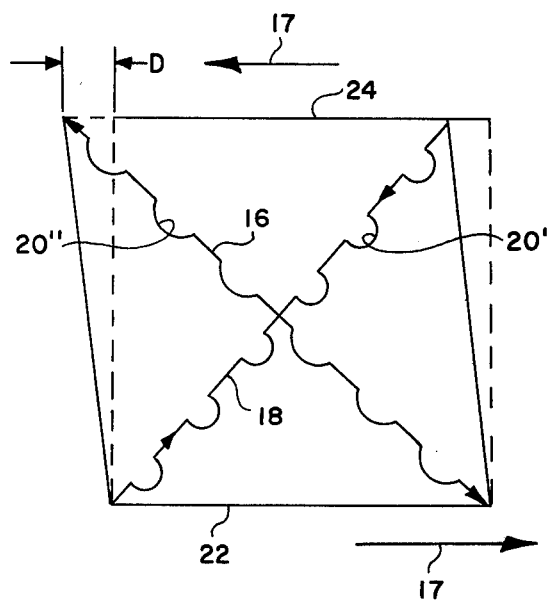
FIG. 5 is a schematic view of the same section of shear flexibility material shown in FIG. 3 showing the material being flexed, illustrating the shape of the convolutions and spheres in both 45° directions.

Turning to FIG. 5, the schematic illustrates what happens when the material is moved from side to side. The top edge 24 is moved to the left relative to the fixed bottom edge 22 a distance designated "D" in the upper left-hand corner. If the material is moved this distance, then it can be seen by the intersecting lines 16 and 18 that the convolutions 16 and spherical domes 20' parallel to line or channel 18 are compressed in compression while the convolutions 18 and spherical domes 20" parallel to line 16 are stretched in tension, thus allowing for the material to move this amount without causing damage, i.e. buckling, or stress cracks to the material.

The material 10 may be fabricated from, for example, a 302 Cres stainless steel and stamped to the configuration of the present invention. The stamped stainless steel material will exhibit the properties almost of rubber when configured as taught by this application. Obviously, other materials may beused incorporating the features of this invention without departing from the scope of this invention.

Figure 6:
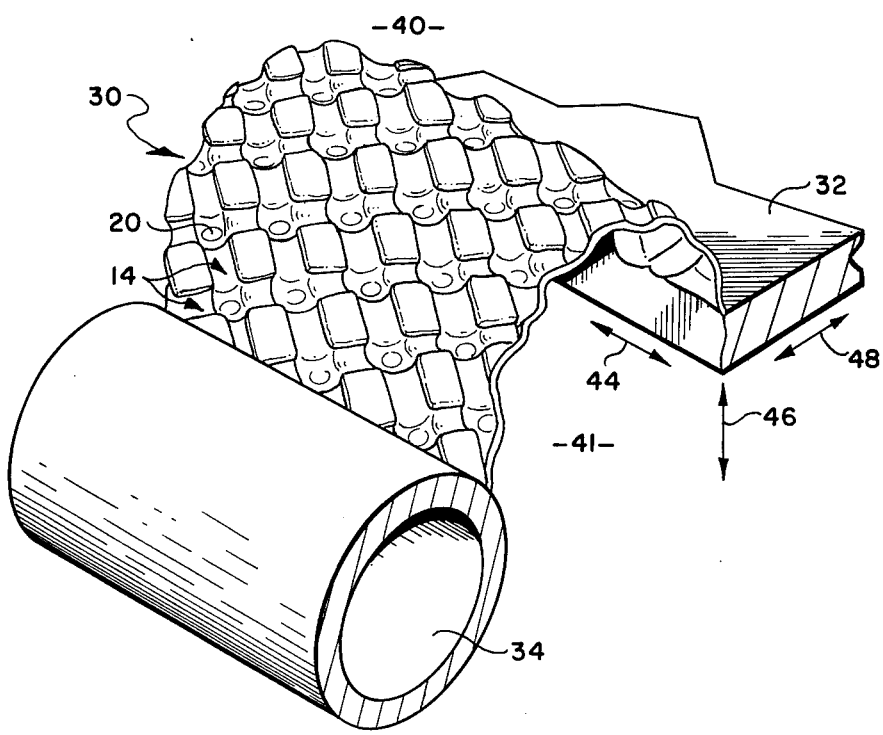
FIG. 6 is a perspective view of the material as typically used.

In a rocket engine it is most common to subject the engine hardware to extreme variations of heat. Thermal gradients may vary as much as 2000° F between components which will cause deformations in the hardware. It is often necessary to provide an impermeable connecting barrier between components with different thermal environments. The barrier must be able to absorb the deformation caused by the thermal gradients between connecting components. For example, in FIG. 6 a base seal 30 fabricated from sheet stainless steel is interposed between and welded to the outer edge of an 800° F turbine exhaust manifold 32 and a −400° F fuel manifold 34. The base steel provides a positive seal to prevent 800° F gas at 5 psi from leaking from between the turbine exhaust base and the engine compartment during firing. The positive seal 30 assures a leak tight condition between an atmosphere 40 above the waffle seal that may be near a vacuum while the atmosphere 41 below the seal is at ambient pressure while maintaining flexibility. The seal in addition to forming a barrier completely around and between components separating the two pressure regions, accommodates for fore and aft movement 44 of exhaust manifold 32 relative to the fuel manifold 34. Up and down movement 46 and in and out movement 48 are easily accommodated simultaneously with the aforementioned fore and aft movement.

Thermal expansion of the turbine exhaust manifold 32 and thermal contraction of the main fuel manifold 34 result in relative motions of approximately 0.5 in. shear deformation 44 of the seal. It can be readily seen that the seal must be capable of withstanding considerable shear deformation. The seal is formed in an inverted U-shaped pattern to accommodate 46 and 48 type relative motions of the turbine manifold 32 with respect to the fuel duct 34. The convolutions 14 and spherical domes 20 were faced inwardly for space considerations. It was determined that the waffle pattern also formed easier this way. Obviously the more material used to bridge the gap between the turbine manifold 32 and the fuel duct 34, the less deformation each convolution will be subjected to.

A typical example of the waffle material is fabricated from 347 Cres sheet steel 0.018 in. thick. The material for example is 8 in. wider for an application requiring 0.5 in. shear translation. The convolutions are spaced on 1-in. centers with the convolution primary radii 0.14 in., the relief radii 0.05 in., and the height 0.19 in. The spherical relief primary radii are 0.21 in., with the corner radii 0.20 in. and the height 0.38 in.

Figure 7:
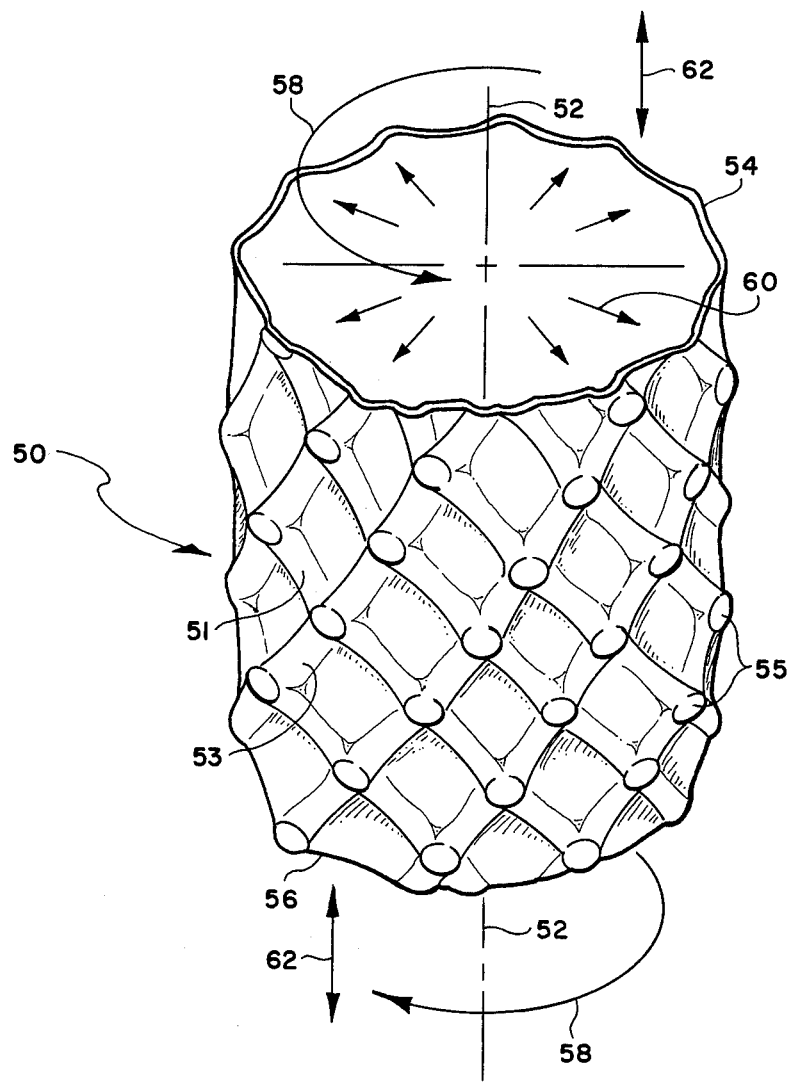
FIG. 7 is a perspective view of the material fabricated into a cylindrical shape.

Turning now to FIG. 7 a cylinder generally designated as 50 is shown with the shear flexibility pattern convolutions 51, 53 with spherical reliefs 55 at their intersections oriented 45° to an axial center line 52. The cylinder or bellows has torsional flexibility about its center line, that is, one end of the cylinder 54 can be rotated (58) about the center line with respect to the other end 56. Cylinder 50, with the shear flexibility pattern as described, can be a pressure vessel in that it is capable of reacting both hoop (60) and axial (62) pressure loads. Applications for such a device would include ducting systems (not shown), which undergo thermal changes and relative deflections, and positive seals (not shown) to replace dynamic seals in limited rotation applications, such as ball valve actuation shafts or the like.

Again, shear flexibility in shell-type structures are accomplished by interrupting the lines of the principal stress with convolutions. The convolutions change the principal membrane tension and compression stresses to bending stresses. This significantly decreases the spring rate in the tension and compression direction and eliminates uncontrolled buckling in the compression direction.

It will of course be realized that various modifications can be made in the design and operation of the present invention without departing from the spirit thereof. Thus, while the principal preferred construction, and mode of operation of the invention have been explained and what is now considered to represent its best embodiment has been illustrated and described, it should be understood that within the scope of the appened claims the invention may be practiced otherwise than as specifically illustrated and described.

I claim:

1. In a combination including a flexible member connected between components that will withstand shear translation up to 0.5 percent across said member, said components being capable of independent movement therebetween comprising:
    a first component, and
    a second component spaced from said first component and adapted to move laterally with respect to said first component, said flexible member being attached to adjacent edges of said first and second components bridging the space between said components, the improvement wherein said flexible member comprises a flat sheet of metal formed with a plurality of linearly extending intersecting convolutions at right angles to one another having a constant cross-section, the radius of said intersecting convolutions is 6 to 12 times the thickness of said sheet of metal, each of said plurality of intersecting convolutions being substantially at a 45° angle to a shear vector and shear translation imparted to said flat sheet of metal, the height of said intersecting convolutions is 9 to 17 times the thickness of said sheet of metal, said intersecting convolution having a spherical domed region extending beyond the apex of each of said intersecting convolutions approximately equal to the height of said convolution of the area of intersection, said spherical domed region serves to interrupt the principal stress lines that act along said apex of each of said convolutions when said flexible member is subjected to said shear vector translations, a wall portion of said constant cross-section intersecting convolutions is formed with a radius 3 to 5 times the thickness of the metal between said wall of said convolutions and a flat portion of said sheet of metal and a radius 3 to 5 times the thickness of the metal between said spherical domed region and said intersecting convolutions.

2. The invention as set forth in claim 1 wherein said flexible member is impermeable.

3. The invention as set forth in claim 2 wherein said flexible member has an overall curvature and a length bridging the space between said first and second components greater than the linear distance between said components, whereby increased flexibility in planes in addition to the shear plane is provided.

4. The invention as set forth in claim 3 wherein said spherical domed region faces inwardly of said curved flexible member.

* * * * *